United States Patent [19]

Aihara

[11] Patent Number: 5,045,876
[45] Date of Patent: Sep. 3, 1991

[54] CAMERA WITH FLASH DEVICE

[75] Inventor: Yoshihiko Aihara, Kanagawa, Japan

[73] Assignee: Canon Kabushiki Kaisha, Tokyo, Japan

[21] Appl. No.: 386,891

[22] Filed: Jul. 28, 1989

[30] Foreign Application Priority Data

Aug. 3, 1988 [JP] Japan .................. 63-194038
Aug. 3, 1988 [JP] Japan .................. 63-194039
Aug. 3, 1988 [JP] Japan .................. 63-194040

[51] Int. Cl.$^5$ .................................. G03B 15/05
[52] U.S. Cl. ............................ 354/418; 354/145.1
[58] Field of Search ............... 354/413, 416, 417, 418, 354/127.1, 127.12, 145.1

[56] References Cited

U.S. PATENT DOCUMENTS

| | | | |
|---|---|---|---|
| 4,023,068 | 5/1977 | Harvey | 354/145.1 |
| 4,258,290 | 3/1981 | Nakajima | 354/127.12 |
| 4,290,677 | 9/1981 | Baumeister | 354/127.12 |
| 4,430,602 | 2/1984 | Ohmori | 354/127.12 |
| 4,566,769 | 1/1986 | Inoue | 354/145.1 |
| 4,610,521 | 9/1986 | Inoue | 354/145.1 |
| 4,737,806 | 4/1988 | Sakaguchi et al. | 354/145.1 |

Primary Examiner—Russell E. Adams, Jr.
Attorney, Agent, or Firm—Robin, Blecker, Daley & Driscoll

[57] ABSTRACT

Disclosed is a camera with a flash device, in particular, a camera with a flash device of the type in which charging of the flash device is suspended when a charged state of the flash device reaches a predetermined level. The above-described type of camera is characterized in that the charging of the flash device is not suspended immediately after the charged state of the flash device has reached the predetermined level but that it is suspended after the flash device has been further charged for a predetermined period of time.

14 Claims, 3 Drawing Sheets

CAMERA WITH FLASH DEVICE

BACKGROUND OF THE INVENTION

1. Field of the Invention

This invention relates to a camera of the type in which a flash device is used, and more particularly, to a built-in flash camera or a camera with an external flash device of the type in which the flash device is automatically flashed when it is determined on the basis of the output of a photometry circuit of the camera that flashing of the flash device ensures a correct exposure, as with a dark or back lighted scene, and in which flashing of the flash device is prohibited when it is determined that flashing of the flash device is not necessary, as with an outdoor scene in the daytime.

2. Description of the Related Art

Various types of built-in flash cameras or cameras with an external flash device of the type in which the flash device is automatically flashed when it is determined at a photometry stage that the scene is dark or back lighted have been proposed recently.

In such cameras, charging of the flash device may be started after it has been determined that the scene is dark or back lighted. In that case, operation of a shutter release button has to be delayed until the charging of the flash device is completed, making it impossible for a photographer to take a picture immediately. In order to eliminate this shortcoming, a camera of the type in which waiting for the charging of the flash device is eliminated by automatically starting charging of the flash device for the next picture immediately after a picture has been taken has been proposed.

In the conventional camera of the above-described type, the flash is continuously charged until the voltage of the flash reaches a predetermined value required for flashing in a state where no monitoring is performed, charging being stopped when the voltage has reached the predetermined value. In consequence, in a case where a battery has been used up and the voltage of the battery is too low to charge the flash, charging of the flash may not be completed for a long period of time, during which time the booster circuit for the flash is continuously operated, causing heating of the component of the booster circuit, such as a transistor or a coil.

In that case, if use of the battery is stopped for a while, the voltage may recover by virtue of the characteristics of the battery, making it possible for the flash to be charged by that battery. However, in a case where the battery is used for a long period of time, it is often used up to such a degree that recovery thereof is impossible.

Furthermore, in the above-described type of camera, when the flash has been charged to a voltage sufficient for flashing, charging is stopped instantly.

However, after charging, the capacitor for the flash leaks gradually, thereby gradually reducing the charged voltage.

In consequence, the voltage may drop to a value too low for flashing by the time the next picture is taken. In that case, supplementary charging has to be performed immediately before the picture is taken, and operation of the shutter release button has to be meanwhile delayed.

SUMMARY OF THE INVENTION

An object of the present invention is to provide a camera or a flash device which is capable of eliminating the aforementioned problems of the prior art.

To this end, the present invention provides in one aspect a flash device for use in the conventional camera. This flash device has the function of stopping the charging of the flash device when the flash device fails to acquire the voltage required for flashing within a fixed period of time.

Another object of the present invention is to provide a camera of the type in which a flash device is used and which enables the supplementary charging of the flash device to be eliminated, thereby making series photography possible.

To this end, the present invention provides in one aspect a camera of the type in which the flash device is charged immediately after a picture has been taken until its voltage reaches the minimum value required for flashing for the next photographic operation and in which charging of the flash device is stopped when the flash device has been further charged for a fixed period of time after the voltage of the flash device reaches the minimum necessary voltage.

The present invention provides in one aspect a camera or a flash device which comprises first output means for outputting a signal indicating that charging of the flash device is permitted, and first control means for switching over charging and stoppage of charging of the flash device in response to the signal from the first output means. In this camera, in a case where the flash device is flashed, even if it is determined that the flash device has been charged to a voltage higher than that which ensures a correct exposure, the flash device is further charged for a fixed period of time and then the camera is used for a subsequent photographic operation.

Other objects of the present invention will become more apparent from the following description of the preferred embodiment thereof, taken in conjunction with the accompanying drawings.

DETAILED DESCRIPTION OF THE PREFERRED EMBODIMENT

Figure 1:
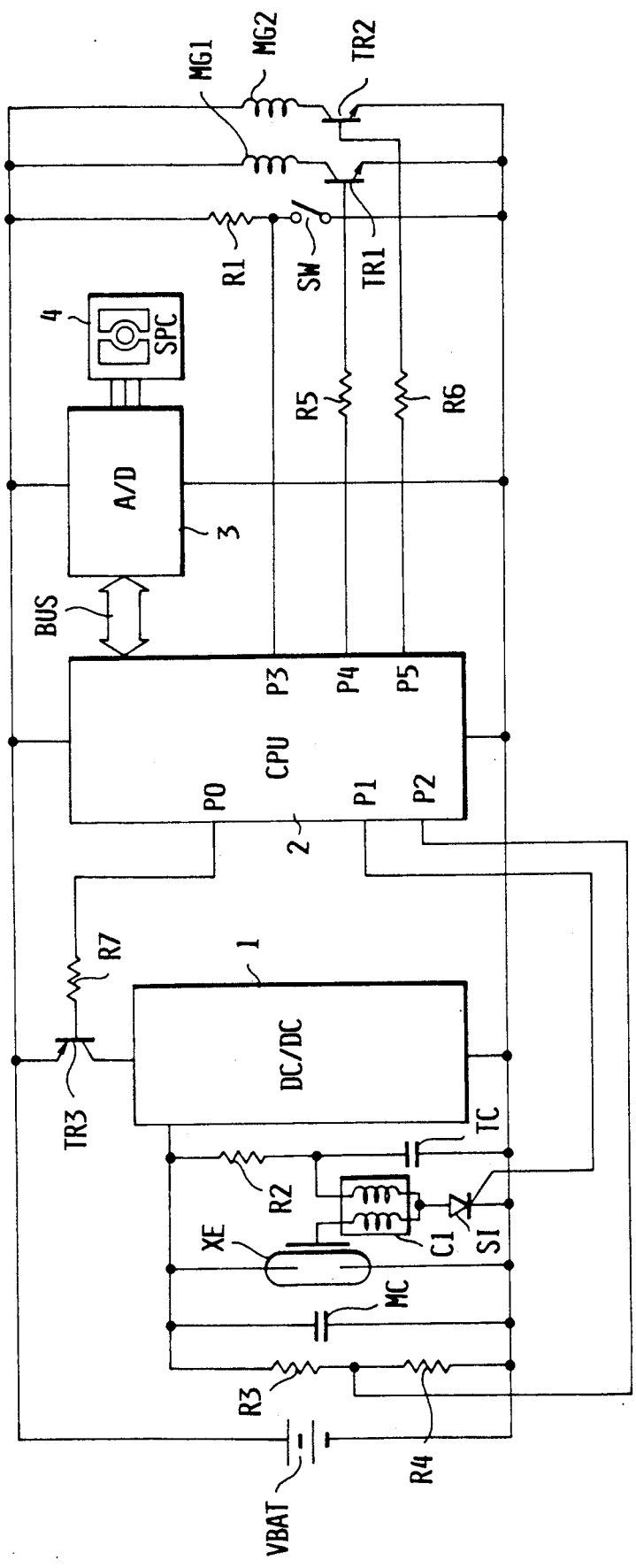
FIG. 1 is a circuit diagram of an electric circuit for a camera, showing an embodiment of the present invention.

FIG. 1 is a circuit diagram of an electric circuit for a built-in flash single-lens reflex camera, showing an embodiment of the present invention.

In FIG. 1, a reference numeral 1 denotes a DC-to-DC converter for boosting the output of a battery VBAT which is the power source of a flash device; 2 denotes a microcomputer for controlling the operation of the circuit; 3 denotes an analog-to-digital converting circuit; and 4 denotes a light metering element which may be a silicon photo-diode or the like. The light metering element 4 is composed of a plurality of metering elements so as to achieve the metering of light on the divided areas of a picture frame. The output of the light metering element 4 is converted into a digital signal by the A/D converting circuit 3, and the converted signal is transmitted to the microcomputer 2 through a bus line BUS.

A reference symbol SW denotes a switch which turns on in association with the pressing of a release button of the camera; R1 denotes a pull-up resistor; MG1 denotes an electromagnet which is energized when a mechanism member (not shown) for locking the running of a leading curtain of a shutter is to be disengaged; MG2 denotes an electromagnet which is energized when a mechanism member (not shown) for locking the running of a trailing curtain of the shutter is to be disengaged; TR1 denotes a switching transistor for switching on the electromagnet MG1; TR2 denotes a switching transistor for switching on the electromagnet MG2. The bases of the transistors TR1 and TR2 are respectively connected to output ports P4 and P5 of the microcomputer 2 through base resistors R5 and R6.

The output of the converter 1 is connected to a flash device flashing circuit. A trigger capacitor TC for starting the flashing is grounded at one end. The other end of the trigger capacitor TC is connected to the output of the converter 1 through a resistor R2 and to a thyristor SI through a coil C1. A gate of the thyristor SI is connected to an output port P1 of the microcomputer 2, so that flashing of the flash device can be controlled by the microcomputer 2.

A reference symbol MC denotes a main capacitor; XE denotes a xenon flashtube; R3 and R4 denote voltage dividing resistors used to detect the voltage charged to the main capacitor MC. The divided voltages of the main capacitor MC are input to an input port P2 of the microcomputer 2 so as to inform the microcomputer 2 whether or not the main capacitor MC is sufficiently charged. A reference symbol TR3 denotes a switching transistor which switches on and off the supply of power to the flash device flashing circuit including the converter 1. A base of the switching transistor TR3 is connected to an output port P0 of the microcomputer 2 through a base resistor R7, by means of which the microcomputer 2 controls the supply of power to the flash device.

Next, the operation of the electric circuit arranged in the manner shown in FIG. 1 will be described below with reference to the flowchart of the operation of the microcomputer 2.

Figure 2A:
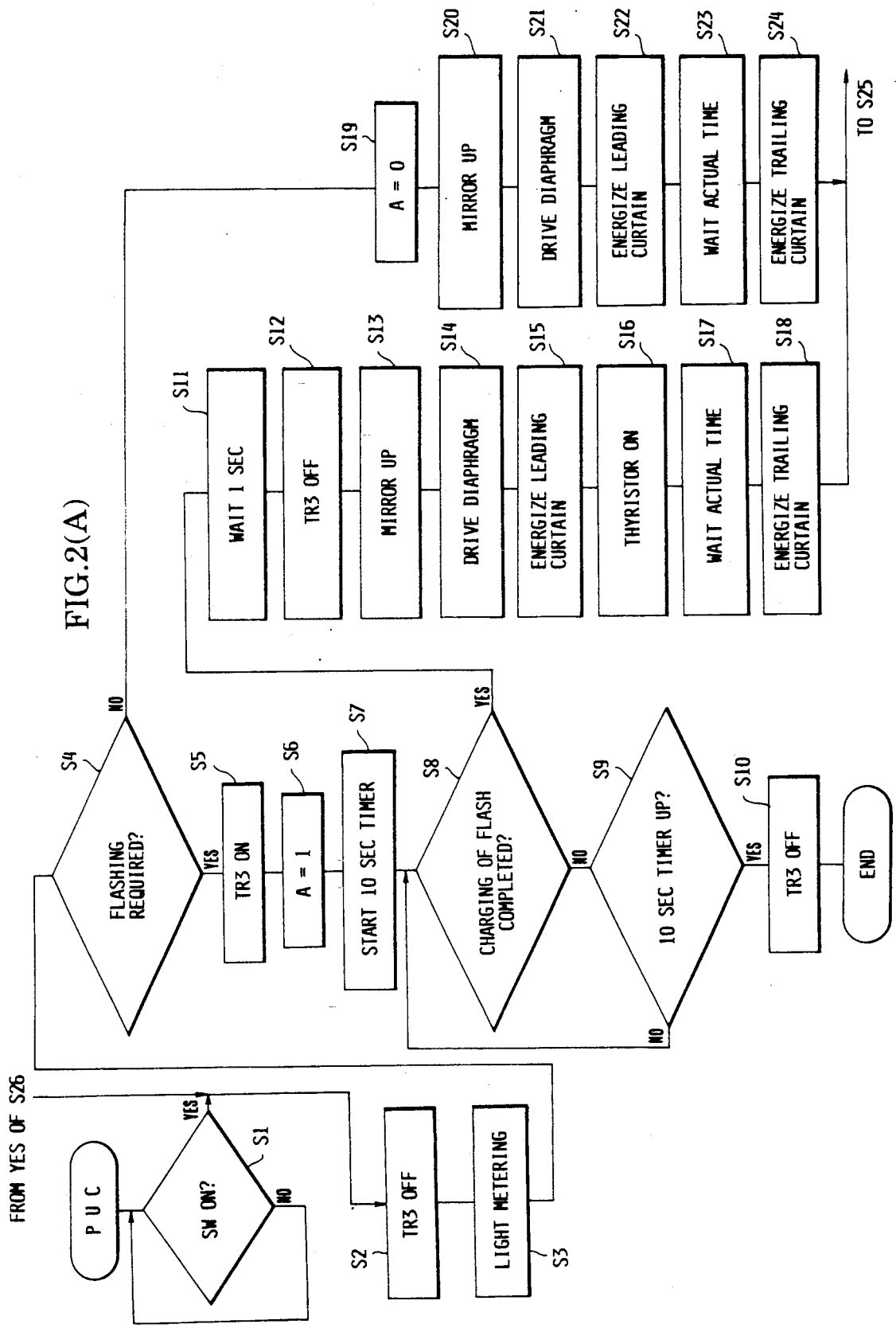
FIGS. 2(A) and 2(B) are flowcharts of the programs, explaining the operation of the circuit of FIG. 1.
Figure 2B:
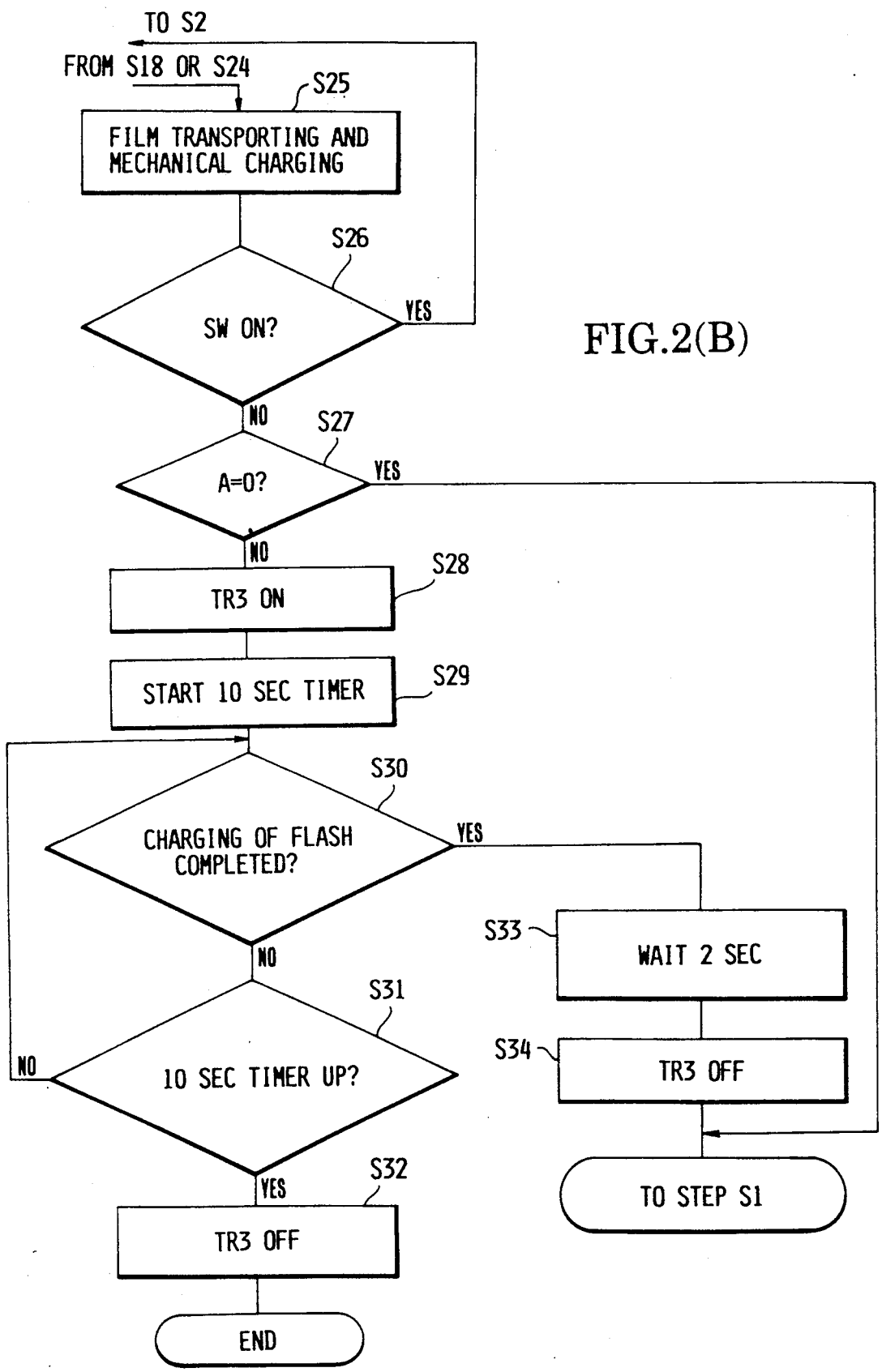

FIGS. 2(A) and 2(B) are flowcharts of one of the operations of the microcomputer 2.

Step S1

It is determined whether or not the release button switch SW is on.

If the release button switch SW is on, the processing goes to step S2. If the switch SW is off, the processing returns to step S1 and repeats the processing of step S1 until the release button is pressed.

Step S2

The microcomputer 2 outputs a logical high level signal from the output port P0 to turn off the switching transistor TR3 and thereby stop supply of power to the flash device circuit.

Step S3

The output of the light metering element 4 is supplied to the A/D converting circuit 3 to obtain light metering data. Determination as to whether or not it is a dark or back lighted scene which requires flashing of the flash device is made on the basis of this metering data. In this determination, the output of the light metering element 4 may be compared with a reference value, and it may be determined that flashing of the flash device is necessary if the output of the light metering element 4 is, for example, smaller than the reference value.

Step S4

If it is determined in step S3 that flashing is not necessary, the processing goes to step S19. If the flashing is necessary because of a back light or dark scene, the processing goes to step S5.

Step S5

The microcomputer 2 outputs a logical low level signal from the output port P0 to turn on the switching transistor TR3 and thereby start supply of power to the flash device flashing circuit.

Step S6

"1" is set in a register A which memorizes that the flash device has been flashed and which determines whether or not the flash-device is charged.

Step S7

A timer which is designed to count 10 seconds is started. A time interval of 10 seconds is the upper limit of the charging time of the flash device.

Step S8

The microcomputer 2 determines by reading the input port P2 whether or not the charging of the flash device has been completed. The voltage dividing resistors R3 and R4 are set such that they produce a voltage which exceeds the input threshold of the microcomputer 2 when the capacitor has been charged to a sufficient voltage. A logical high level signal is therefore input to the input port P2 when the charging has been completed, and then the processing goes to step S11. If the charging is not completed, the processing goes to step S9.

Step S9

It is determined whether or not 10 seconds set in the timer is up. If the time set in the timer is up, it is determined that charging of the flash device has not been completed within a predetermined period of time, and the processing goes to step S10. If the time is not yet up, the processing returns to step S8 and execution of the processing returns to step S8 and execution of the processings S8 and S9 is repeated. Once the charging of the flash device has been completed, the processing goes from step S8 to step S11.

Step S10

Since the charging was not completed within the predetermined period of time, the switching transistor TR3 is turned off to stop supply of power to the flash device, thereby completing the sequence.

Step S11

After the charging of the flash device has been completed, the flash device is charged for another 1 second. In this way, the charging voltage can be raised to a level which ensures flashing of the flash device even when the charging voltage gradually drops due to the leakage which occurs during the mirror-up operation and the driving of a diaphragm.

Step S12

Since the mirror-up and the driving of the diaphragm consume a large amount of power, the switching transistor TR3 is turned off and the charging of the flash device is thereby stopped.

Step S13

The mirror is sprung up by energizing a motor (not shown).

Step S14

The diaphragm (not shown) of a lens is narrowed to a position determined by the metered light value.

Step S15

The microcomputer 2 outputs a logical high level signal from the output port P4 to turn on the switching transistor TR1 and thereby energize the electromagnet MG1. This causes the leading curtain of a shutter (not shown) to run, thereby causing an exposure to be started.

Step S16

The microcomputer 2 outputs a logical high level signal from the output port P1 to turn on the thyristor SI and thereby discharge the trigger capacitor TC through the coil C1. This causes the coil C1 to apply a high voltage to the outer periphery of the xenon flashtube XE, thereby causing the xenon flashtube Xe to flash.

Step S17

Completion of the exposure is awaited to obtain a correct exposure determined by the metered light value.

Step S18

The microcomputer 2 outputs a logical high level signal from the output port P5 to turn on the switching transistor TR2 and thereby energize the electromagnet MG2. This causes the trailing curtain (not shown) of the shutter to run, thereby completing the exposure.

If it is determined in step S4 that flashing is not necessary, the following processings are carried out.

Step S19

"0" is set in the register A which memorizes that the flash device has been flashed and which determines whether or not the flash device is charged. "0" means that flashing of the flash device is not performed.

Thereafter, the same processings as those carried out when the flashing is to be performed are executed. More specifically, step S20 which is similar to step S13, step S21 similar to step S14, step S22 similar to step S15, step S23 similar to step S17 and step S24 similar to step S18 are executed in that order.

The processings from step S20 to step S24 represent series of exposure operations. Since the thyristor SI is not turned on, flashing is not performed regardless of completion or non-completion of the charging of the flash device.

Step S25

A film transporting and shutter charging motor (not shown) is energized to transport a film and to charge the shutter.

Step S26

It is determined whether or not the release button is still being pressed.

Pressing of the release button means that series of pictures are being taken. In consequence, the processing returns to step S2. If the release button is not pressed, the processing goes to step S27, and as to whether or not charging of the flash device is performed for a subsequent photographic operation is determined.

Step S27

Whether the flash device has been flashed or not, the register A is checked after the exposure operation has been completed. If it is determined that "0" is set in the register A, the processing returns to step S1 without charging the flash device and subsequent pressing of the release button is awaited. If "0" is not set in the register A, the processing goes to step S28.

Step S28

When "0" is not set in the register A, the microcomputer 2 outputs a logical low level signal from the output port P0 to turn on the switching transistor TR3 and thereby starts supply of power to the flash device flashing circuit to prepare the camera for a subsequent photographic operation.

Step S29

The time which is designed to count 10 seconds is started. A time interval of 10 seconds is the upper limit of the charging time of the flash device.

Step S30

The microcomputer 2 determines by reading the input port P2 whether or not the charging of the flash device has been completed. The voltage dividing resistors R3 and R4 are set such that they produce a voltage which exceeds the input threshold of the microcomputer 2 when the capacitor has been charged to a sufficient voltage. A logical high level signal is therefore input to the input port P2 when the charging has been completed, and then the processing goes to step S33. If the charging is not completed, the processing goes to step S31.

Step S31

It is determined whether or not 10 seconds set in the timer is up. If the time set in the timer is up, it is determined that charging of the flash device has not been completed within a predetermined period of time, and the processing goes to step S32. If the time is not yet up, the processing returns to step S30 and execution of the processings S30 and S31 is repeated. Once the charging of the flash device has been completed, the processing goes from step S30 to step S31.

Step S32

Since the charging was not completed within the predetermined period of time, the switching transistor TR3 is turned off to stop supplying power to the flash device, thereby completing the sequence.

Step S33

After the charging of the flash device has been completed, the flash device is charged for another 2 seconds. In this way, the charging voltage can be maintained at a level which ensures that a picture can be taken with flashing of the flash device without release time lag even when the charging voltage is gradually decreased due to the leakage which occurs before a subsequent picture is taken.

Step S34

The switching transistor TR3 is turned off and charging of the flash device is stopped. Thereafter, the processing returns to the step S1 to prepare the camera for a subsequent pressing operation of the release button.

As will be understood from the foregoing description, when the flash device cannot be charged within a predetermined period of time after a picture has been taken, charging of the flash device is stopped, thus eliminating any disadvantage that occurs when charging of the flash device continues for a long time after a picture has been taken.

Furthermore, since the flash device is further charged for a predetermined period of time after it has been charged to a predetermined voltage, even if leakage occurs afterwards, the flash device can be maintained in a state in which it can flash.

What is claimed is:

1. A flash device for a camera in which exposure is started after an exposure preparatory operation is performed with a release signal provided by a release control circuit on operation of a release operation member, comprising:
   (a) a capacitor for storing flashing energy;
   (b) a detection circuit for detecting whether or not a charging level of said capacitor has reached a predetermined level;
   (c) a charging and sequence control circuit which is actuated by operation of said release operation member to start the charging to the capacitor, said circuit performing a further charging of said capacitor for a predetermined time after detection by said detection circuit that the charge level of said capacitor has reached said predetermined level and then stopping the charging to said capacitor and forming a release signal.

2. A flash device according to claim 1, wherein said charging and sequence control circuit includes a timer circuit which operates when said detection circuit determines that said capacitor has been charged to said predetermined level, said charging and sequence control circuit stopping the charging of said capacitor after the time regulated by said timer circuit has elapsed.

3. A flash device according to claim 1, wherein said charging and sequence control circuit has a DC/DC converter for boosting an output of a power source, a charging circuit for charging the capacitor with an output of said converter and a switching circuit for controlling operation and non-operation of said converter to perform the charging by making said converter operative and to stop the charging by making said converter non-operative.

4. A camera system having a flash device and a camera, comprising:
   (a) a release operation member;
   (b) a capacitor for storing flashing energy;
   (c) a detection circuit for detecting whether or not a charge level of said capacitor has reached a predetermined level;
   (d) a control circuit which is actuated by operation of said release operation member to start the charging to the capacitor, said control circuit performing a further charging of said capacitor for a predetermined time after the detection by said detection circuit that the charge level of said capacitor has reached said predetermined level, then stopping the charging to said capacitor and forming a release signal; and
   (e) a camera control member for performing an exposure preparatory operation in response to said release signal and starting exposure after completion of said exposure preparatory operation.

5. A camera system according to claim 4, wherein said control circuit has a timer which is actuated with the detection by said detection circuit that the charge level of said capacitor has reached said predetermined level and counts said predetermined time.

6. A camera system according to claim 4, wherein said camera control member is a diaphragm mechanism and the exposure preparatory operation is a stopping down operation.

7. A camera system comprising a flash device and a camera having a first mode in which a photographing operation is performed while a release operation member is in an operative state, and a second mode in which a photographing operation is performed every time the release operation member is operated, comprising:
   (a) a capacitor in which a flash energy to a flash tube is charged; and
   (b) a charge control circuit for charging the capacitor, said control circuit performing the charging to said capacitor at every photographing operation under a first charging treatment condition when the camera is in the first mode, and performing the charging to the capacitor after the completion of the photographing operation under a second charging treatment condition different from said first charging treatment condition when the camera is in the second mode.

8. A system according to claim 7, wherein said second charging treatment condition is such that the charge level of the capacitor is controlled to be higher than that controlled under the first charging treatment condition.

9. A system according to claim 8, wherein said second charging treatment condition is such that the charging time to the capacitor is set longer than that set under the first charging treatment condition.

10. A system according to claim 7, wherein said charge control circuit has a detection circuit for detecting whether or not the charge condition of the capacitor has reached a predetermined level, and performs a further charging to the capacitor for a first period of time after said detection circuit detects the charge level has reached the predetermined level under the first charging treatment condition, and under the second charging treatment condition performs a further charging for a second period of time longer than the first period of time after the charge level has reached the predetermined level.

11. A camera system comprising a camera and a flash device, said system comprising:
   (a) a capacitor to which a flash energy to a flash tube is charged;
   (b) a charge circuit for charging the capacitor, said circuit performing the charging treatment of the capacitor under a first treatment condition or a second treatment condition different from the first treatment condition; and
   (c) a control circuit for actuating said charge circuit before a camera exposure starts and after the camera exposure finishes, said control circuit setting said first treatment condition for the charging treatment by the charging circuit before the camera exposure and setting said second treatment condition for the charging treatment by the charging circuit after the camea exposure.

12. A system according to claim 11, wherein said second treatment condition is such that the charge level of the capacitor is controlled to be higher than that controlled under the first treatment condition.

13. A system according to claim 12, wherein said second treatment condition is such that the charging time to the capacitor is set longer than that set under the first treatment condition.

14. A system according to claim 11, wherein said charge circuit has a detection circuit for detecting whether or not the charge condition of the capacitor has reached a predetermined level, and performs a further charging to the capacitor for a first period of time after said detection circuit detects that charge level has reached the predetermined level under the first charging treatment condition, and under the second treatment condition performs a further charging for a second period of time longer than the first period of time after the charge level has reached the predetermined level.

* * * * *